(12) United States Patent
Kranz et al.

(10) Patent No.: US 8,932,701 B2
(45) Date of Patent: Jan. 13, 2015

(54) LAMINATES AND METHODS OF MAKING SAME

(75) Inventors: Heather K. Kranz, North Oaks, MN (US); Jeffrey A. Boettcher, Woodbury, MN (US); Janet R. Kirkman, Minneapolis, MN (US); Peter T. Dietz, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 201 days.

(21) Appl. No.: 10/564,677

(22) PCT Filed: Feb. 23, 2004

(86) PCT No.: PCT/US2004/005273
§ 371 (c)(1),
(2), (4) Date: Oct. 17, 2006

(87) PCT Pub. No.: WO2005/017580
PCT Pub. Date: Feb. 24, 2005

(65) Prior Publication Data
US 2007/0053088 A1    Mar. 8, 2007

Related U.S. Application Data

(60) Provisional application No. 60/488,188, filed on Jul. 16, 2003.

(51) Int. Cl.
| | | |
|---|---|---|
| B32B 23/02 | (2006.01) | |
| F21V 9/04 | (2006.01) | |
| B32B 17/10 | (2006.01) | |
| B32B 27/08 | (2006.01) | |
| G02B 5/28 | (2006.01) | |

(52) U.S. Cl.
CPC ..... *B32B 17/10302* (2013.01); *B32B 17/10036* (2013.01); *B32B 17/10293* (2013.01); *B32B 17/10761* (2013.01); *B32B 17/10935* (2013.01); *B32B 27/08* (2013.01); *G02B 5/282* (2013.01)
USPC ............ 428/192; 428/426; 428/483; 359/359

(58) Field of Classification Search
USPC ....................... 428/423.1, 349, 192
See application file for complete search history.

(56) References Cited

U.S. PATENT DOCUMENTS

| | | | | |
|---|---|---|---|---|
| 4,046,951 | A | * | 9/1977 | Stefanik .................... 428/412 |
| 4,368,945 | A | * | 1/1983 | Fujimori et al. .............. 359/360 |

(Continued)

FOREIGN PATENT DOCUMENTS

| | | |
|---|---|---|
| EP | 0 724 955 A2 | 8/1996 |
| EP | 0 847 965 A1 | 6/1998 |

(Continued)

*Primary Examiner* — Michele L Jacobson
*Assistant Examiner* — Anthony J Frost (57) ABSTRACT

An optical sheet suitable for use in a laminate comprising at least one glazing component. The optical sheet comprises a non-metallic multi-layer optical film that has multiple optical layers, and can be, for example, a solar energy reflective film (e.g., an infrared radiation reflective film). The multiple layers are thermally and/or otherwise fused together along all, substantially all or at least a substantial portion of the peripheral edge of at least the optical film, so as to prevent or at least substantially reduce the occurrence or degree of delamination of the multiple layers along all, substantially all, or the substantial portion of the peripheral edge of the optical film. At least the optical film can be dimensioned such that, when bonded to a glazing component, all, substantially all or at least the substantial portion of the peripheral edge of at least the optical film is positionable so as to be co-extensive with or substantially co-extensive with a corresponding portion of the peripheral edge of the glazing component to which the optical sheet is to be bonded.

16 Claims, 3 Drawing Sheets

(56) References Cited

U.S. PATENT DOCUMENTS

| | | | |
|---|---|---|---|
| 4,799,745 A | 1/1989 | Meyer et al. | |
| 4,945,203 A * | 7/1990 | Soodak et al. | 219/121.64 |
| 5,103,337 A | 4/1992 | Schrenk et al. | |
| 5,103,557 A | 4/1992 | Leedy | |
| 5,223,465 A | 6/1993 | Ueki et al. | |
| RE34,605 E | 5/1994 | Schrenk et al. | |
| 5,360,659 A | 11/1994 | Arends et al. | |
| 5,882,774 A | 3/1999 | Jonza et al. | |
| 6,045,896 A | 4/2000 | Boire et al. | |
| 6,049,419 A | 4/2000 | Wheatley et al. | |
| 6,157,490 A | 12/2000 | Wheatley et al. | |
| 6,174,592 B1 | 1/2001 | Sperger et al. | |
| 6,207,260 B1 | 3/2001 | Wheatley et al. | |
| 6,230,749 B1 | 5/2001 | Kertesz | |
| 6,334,382 B2 * | 1/2002 | Gourio | 89/36.02 |
| 2001/0013668 A1 * | 8/2001 | Neavin et al. | 264/1.7 |
| 2003/0219577 A1 * | 11/2003 | Tait et al. | 428/212 |

FOREIGN PATENT DOCUMENTS

| | | | | |
|---|---|---|---|---|
| FR | WO 02/33207 A1 * | 4/2002 | | E06B 3/663 |
| WO | WO 99/36248 | 7/1999 | | |
| WO | WO 01/23915 A1 | 4/2001 | | |
| WO | WO 01/96104 * | 5/2001 | | |
| WO | WO 01/96104 A2 | 12/2001 | | |
| WO | WO 02/061469 A3 | 8/2002 | | |
| WO | WO 03/016047 A2 | 2/2003 | | |
| WO | WO 03/057479 A2 | 7/2003 | | |
| WO | WO 03/100476 A2 | 12/2003 | | |

* cited by examiner

LAMINATES AND METHODS OF MAKING SAME

CROSS REFERENCE TO RELATED APPLICATIONS

This application is a national stage filing under 35 U.S.C. 371 of PCT/US04/05273, filed Feb. 23, 2004, which claims priority to U.S. Provisional Application No. 60/488,188, filed Jul. 16, 2003, the disclosures of which are incorporated by reference in their entireties herein.

FIELD OF THE INVENTION

The present invention relates to non-metallic multi-layer optical films, laminates comprising such optical films, and methods of making such laminates.

BACKGROUND

Conventional automotive or architectural glazing or window structures often include a laminate typically made of two rigid glass or plastic sheets and an interlayer of plasticized polyvinyl butyral (PVB). The glazing is prepared by first placing a PVB layer between the two rigid sheets. The PVB layer is typically sized and positioned so as to either extend beyond or be flush with the periphery of the two rigid sheets. Air is then eliminated from the engaging surfaces, and the assembly is then subjected to elevated temperature and pressure (e.g., in an autoclave) to fusion bond the PVB and the rigid sheets into a laminate suitable for use in the window structure. After the rigid sheets are bonded together, excess PVB extending out beyond the periphery of the rigid sheets is typically trimmed off. Such laminates have been used for automotive and architectural glazing applications.

These laminates have also included a functional sheet engineered to enhance the performance of the resulting glazing. One such functional sheet is designed to reflect infrared radiation (IR) away from the interior of a building or vehicle cabin. An example of such an IR reflective sheet can be found in U.S. Pat. Nos. 5,882,774, 6,049,419, 5,103,557, 5,223,465, 5,360,659 and 4,799,745. In the forming of a laminate suitable for a glazing or window structure, such a functional sheet is typically bonded between two sheets of glass using two sheets of PVB, with one sheet of PVB being used to bond one of the glass sheets to each side of the functional sheet.

SUMMARY OF THE INVENTION

A number of challenges have been encountered by the applicants in making a glazing laminate suitable for a window structure using an optical sheet comprising a non-metallic multi-layer optical film (e.g., an IR reflective film). A useful multi-layer optical film can include a stack of 100 or more optical layers. Through empirical studies, it has been found that such optical films can exhibit interlayer delamination (i.e., delamination between the multiple optical and/or other layers of the optical film) to the point of adversely affecting the optical performance of the film, as well as being an aesthetic defect. This delamination initiates at the peripheral edge of the optical film and propagates in toward the center of the film. Without intending to be bound by any theory, it is believed that this delamination is caused, at least in part, by the stresses that can be placed on the optical film during or as a result of glazing lamination processing, and in particular during or as a result of the glazing lamination bonding process (e.g., during autoclaving or other bonding operations). Such stresses may be caused, for example, by one or more of shrinkage of the optical film, shrinkage of the bonding sheets, imprecise cutting of the optical film and the comparative curvature of the glazing components used. For example, the lamination of flat glazing component sheets typically produce lower stresses than the lamination of compound curved glazing component sheets.

The present invention provides a solution for preventing or at least substantially reducing the problem of edge delamination of such optical films. Such edge delamination has been found to be particularly problematic with those peripheral edge portions of the optical film that are co-extensive with or substantially co-extensive with a corresponding portion of the peripheral edge of the glazing component(s) to which the optical sheet is to be adhered. Such edge delamination has been found to be more particularly problematic with those peripheral edge portions of the optical film that are left exposed or at least not encapsulated within bonding sheet material, or within any other bonding material applied so as to encapsulate the peripheral edge of at least the optical film. With the present invention, such edge delamination of the optical film can be prevented or at least substantially reduced even in laminates (e.g., glazing laminates) made with all, substantially all, or at least a substantial portion of the peripheral edge of the non-metallic multi-layer optical film being co-extensive with or substantially co-extensive with a corresponding portion of the peripheral edge of each of the glazing components or at least the glazing component to which the optical sheet is to be adhered.

In one aspect of the present invention, an optical sheet is provided that is suitable for use in a laminate comprising at least one glazing component. The optical sheet comprises a non-metallic multi-layer optical film that is transparent or at least translucent and has a peripheral edge. The optical film has multiple optical layers, and can have other layers. The optical film can be, for example, a solar energy reflective film (e.g., an infrared radiation reflective film). The optical sheet, or at least the optical film, is dimensioned such that, when bonded to a glazing component, all, substantially all or at least a substantial portion of the peripheral edge of the optical sheet, or at least the optical film, is positionable so as to be co-extensive with or substantially co-extensive with a corresponding portion of the peripheral edge of the glazing component to which the optical sheet is to be bonded. The multiple layers are thermally and/or otherwise fused together (e.g., by applying heat, radiation, and/or by causing a chemical reaction between the layers) along all, substantially all or at least the substantial portion of the peripheral edge of the optical sheet, or at least the optical film, so as to prevent or at least substantially reduce the occurrence or degree of delamination of the multiple layers along all, substantially all, or the substantial portion of the peripheral edge of the optical film.

The applicable portion of the optical film peripheral edge can be fused, for example, by cutting the optical sheet, or at least the optical film, with an instrument such as a heated blade or a focused or de-focused laser, etc. The fusing of the multiple layers can also be accomplished by sufficiently heating the peripheral edge, of the optical sheet, or at least the optical film, that was previously cut (e.g., with a mechanical cutting instrument like a knife blade or with an instrument like a heated blade or laser), for example, with a hot air gun, a flame, etc.

In one embodiment, the optical sheet, or at least the optical film, is dimensioned so that substantially all of the peripheral edge of the optical sheet, or at least the optical film, is positionable so as to be substantially co-extensive with a corresponding portion of the peripheral edge of the glazing component, and the multiple layers are fused together along substantially all of the peripheral edge of the optical sheet, or at least the optical film, so as to at least substantially reduce delamination of the multiple layers along substantially all of the peripheral edge of the optical film.

In another aspect of the present invention, a laminate is provided that comprises the above optical sheet and a first bonding sheet. The laminate can be transparent or at least translucent and the optical sheet can be transparent or at least translucent. The first bonding sheet is suitable for bonding to a glazing component (e.g., a sheet of transparent or translucent plastic or glass suitable for use as a window) and to the optical sheet. A major surface of the optical sheet and a major surface of the first bonding sheet are positioned together. The optical sheet, or at least the optical film, is dimensioned so that all, substantially all or at least a substantial portion of a peripheral edge of the optical sheet, or at least the optical film, is positionable so as to be co-extensive with or substantially co-extensive with a corresponding portion of a peripheral edge of the glazing component to which the optical sheet is to be bonded. During the initial stages of the laminate, the major surface of the optical sheet and the major surface of the first bonding sheet may only be partially bonded together; eventually they are fully bonded together.

In one embodiment of a laminate according to the present invention, the optical sheet, or at least the optical film, is dimensioned so that substantially all or all of the peripheral edge of the optical sheet, or at least the optical film, is positionable so as to be co-extensive with or substantially co-extensive with the peripheral edge of the glazing component to which the optical sheet is to be bonded, and the multiple layers are thermally and/or otherwise fused together along substantially all or all of the peripheral edge of the optical sheet, or at least the optical film, so as to prevent or at least substantially reduce delamination of the multiple layers along the peripheral edge of the optical film.

In an additional aspect of the present invention, the laminate can further comprise a second bonding sheet having a major surface positioned relative to the other major surface of the optical sheet such that the optical sheet is disposed between the first bonding sheet and the second bonding sheet, where the second bonding sheet is also suitable for bonding to the major surface of another glazing component. During the initial stages of this laminate, the opposite major surfaces of the optical sheet and the corresponding major surfaces of the first and second bonding sheets may only be partially bonded together; eventually they are fully bonded together.

In a further aspect of the present invention, the laminate can be a glazing laminate that further comprises two transparent or at least translucent glazing components. Each of the first bonding sheet and the second bonding sheet has another major surface that faces the major surface of one or the other of the glazing components, the optical sheet is disposed between the first and second bonding sheets, the first and second bonding sheets are disposed between the glazing components, and all, substantially all or at least the substantial portion of the peripheral edge of the optical sheet, or at least the optical film, is positioned so as to be co-extensive with or substantially co-extensive with a corresponding portion of the peripheral edge of both or at least one of the glazing components. For example, if one of the glazing components is larger in surface area than the other glazing component and/or the one glazing component has a peripheral edge that extends beyond that of the other glazing component, then all, substantially all or a substantial portion of the peripheral edge of the optical sheet, or at least the optical film, may be dimensioned and positioned so as to be co-extensive with or substantially co-extensive with the corresponding portion of the peripheral edge of either glazing component.

During the initial stages of this laminate, each of the first and second bonding sheets may only be partially bonded to its respective glazing component or fully bonded to its respective glazing component. In addition, all, substantially all or at least the substantial portion of the peripheral edge of the optical sheet, or at least the optical film, may be exposed or at least not encapsulated within bonding sheet material or within any other bonding material.

In one example where it may be acceptable for only a substantial portion of the peripheral edge of the present optical sheet, or at least the optical film, to be substantially fused together, one or more portions of the peripheral edge of the glazing component(s), to which the optical sheet is bonded, may be masked or otherwise hidden from view. In such a case, the portion(s) of the peripheral edge of the optical sheet that correspond to the masked or otherwise hidden portions of the glazing component(s) may not need to be fused, because it too may be masked or hidden. In which case, the appearance of a delamination on such a hidden portion of the peripheral edge of the optical sheet may be acceptable.

In another aspect of the present invention, a method is provided for making a glazing laminate for use in a window structure, where the glazing laminate comprises an optical sheet sandwiched between two bonding sheets and the bonding sheets sandwiched between two glazing components. The method comprises providing the optical sheet; dimensioning the optical sheet so that all, substantially all or at least a substantial portion of the peripheral edge of at least the optical film is positionable so as to be co-extensive with or substantially co-extensive with a corresponding portion of the peripheral edge of both or at least one of the glazing components; and thermally and/or otherwise fusing together the multiple layers along all, substantially all or at least the substantial portion of the peripheral edge of the optical sheet, or at least the optical film, so as to prevent or at least substantially reduce the occurrence or degree of delamination of the multiple layers along all, substantially all or the substantial portion of the peripheral edge of at least the optical film. The optical sheet comprises a non-metallic multi-layer optical film with multiple layers. The dimensioning can be performed, for example, by trimming (e.g., with a cutting blade, laser, heated cutting instrument, etc.), applying heat to cause shrinkage at its peripheral edge or otherwise changing the dimensions of the optical sheet. The glazing laminate can be transparent or at least translucent.

In addition to the above method, two bonding sheets and two glazing components can also be provided, with each of the bonding sheets being suitable for bonding to the optical sheet and to the glazing components. Each of the bonding sheets, glazing components and optical sheet can be transparent or at least translucent. The method can further comprise sandwiching the optical sheet between the bonding sheets and the bonding sheets between the glazing components; positioning the optical sheet so that all, substantially all or at least the substantial portion of the peripheral edge of the optical film is positioned so as to be co-extensive with or substantially co-extensive with a corresponding portion of the peripheral edge of both or at least one of the glazing components; and fully bonding the laminate (e.g., the optical sheet, bonding sheets and glazing components) together.

The optical sheet comprises a non-metallic multi-layer optical film such as, for example, a solar energy reflective film like an infrared radiation reflective film. The optical film has multiple optical or other layers, and each of the bonding sheets is suitable for bonding to the optical sheet and to both or at least one or the other of the glazing components. The laminate (e.g., the optical sheet, bonding sheets and glazing components) can be fully bonded together by, for example, applying heat and pressure for a sufficient time to allow the major surfaces of the bonding sheets to flow and sufficiently bond to the respective major surfaces of the optical sheet and of the glazing components. The glazing laminate can be transparent or at least translucent.

This method can further comprise the dimensioning the optical sheet occurring before or after the sandwiching. The dimensioning the optical sheet can also occur before or after the laminate is fully bonded together. For example, the laminate can be fully bonded together with the optical sheet being sized and positioned so that all, substantially all or a substantial portion of its peripheral edge extends beyond the peripheral edge of both or at least one of the glazing components. The dimensioning the optical sheet can then be performed.

In addition, the fusing and/or the dimensioning the optical sheet can occur before the fully bonding. The fusing can also occur after the dimensioning of the optical sheet. For example, the optical sheet can be dimensioned by trimming with a cutting blade and then the fusing can be performed by applying heat to the optical sheet from, for example, a source of hot air (e.g., a hot air gun), a flame (e.g., a butane gas torch), an oven (e.g., the glazing laminate could be placed in an oven long enough for the heat to fuse the peripheral edge of the optical film but not long enough to allow the heat to penetrate the glazing components and fuse the remainder of the optical film).

The dimensioning of the optical sheet and the fusing can also occur simultaneously. The dimensioning of the optical sheet and the fusing can be performed simultaneously by using the same device. For example, the optical sheet can be dimensioned and the resulting peripheral edge fused at the same time by trimming with, for example, a laser, a heated cutting instrument, or by using an oven (e.g., the glazing laminate could be placed in an oven at a temperature and long enough for the heat to fuse and curl-up, or otherwise shrink, the peripheral edge of the optical sheet).

The method can also comprise dimensioning such as, for example, by trimming or otherwise changing the dimensions of the bonding sheets so that after the laminate is fully bonded together, all, substantially all, or at least the substantial portion of the peripheral edge of the optical sheet, or at least the optical film, is exposed or at least not encapsulated within bonding sheet material (e.g., polyvinyl butyral, polyurethane, ionoplast and combinations thereof).

In addition to the benefit from the fusing, in order to further prevent or substantially reduce delaminating stresses from being applied to the optical film (i.e., stresses that would otherwise cause the multiple layers at the optical film's peripheral edge to delaminate), the bonding sheets can optionally be dimensioned, and/or any other bonding material (e.g., polyurethane, polyvinyl acetate, acrylic polymers and silicone bonding materials) applied, so as to encapsulate the peripheral edge of one or both glazing components, the optical sheet, or at least the optical film. For example, the peripheral edge of the optical film can be dimensioned so that the desired portion thereof is co-extensive or substantially co-extensive with a corresponding portion of the peripheral edge of the glazing components. After the fusing, the bonding sheet material or other bonding material can be applied to, for example in the form or a bead along, at least the corresponding portion of the peripheral edge of the glazing components so as to bridge from the peripheral edge of one glazing component to the peripheral edge of the other glazing component along all or a substantial portion of at least the corresponding portion of the glazing components' peripheral edges, such that delaminating stresses applied to the optical film are at least reduced. It is believed that such bridging bonding material absorbs delaminating stresses that would otherwise be applied to the fused peripheral edge of the optical sheet.

The fusing, the dimensioning of the optical sheet and the dimensioning of the bonding sheets can occur simultaneously. The dimensioning of the optical sheet and the bonding sheets and the fusing can be performed simultaneously by using the same device. For example, the optical sheet and bonding sheets can be dimensioned and the resulting peripheral edge of the optical film fused at the same time by trimming the optical sheet and the bonding sheets at the same time with, for example, a laser or a heated cutting instrument.

The dimensioning of the optical sheet can further comprise dimensioning such as, for example, by trimming or otherwise changing the dimensions of the optical sheet so that all, substantially all or at least a remaining portion of the peripheral edge of the optical film (i.e., the remaining portion of the peripheral edge of the optical film that is not fused) is positioned so as to extend substantially beyond and not be co-extensive with the peripheral edge of both or at least one of the glazing components. In addition, the method can include dimensioning such as, for example, by trimming or otherwise changing the dimensions of the bonding sheets so that the peripheral edge of each of the bonding sheets is co-extensive with or substantially co-extensive with or lies substantially within and not co-extensive with the peripheral edge of both of the glazing components.

The dimensioning of the optical sheet and any bonding sheet can occur in one or a number of operations, and these operations can occur simultaneously or in a sequence. At the end of the laminating process, the present method preferably comprises applying at least heat, or heat and pressure, to the laminate for a sufficient time to allow the major surfaces of the first and second bonding sheets to flow and sufficiently bond to the respective major surfaces of the optical sheet and the glazing components.

DEFINITIONS

As used herein, the following terms and phrases are intended to have the following meanings:

"delamination" is indicative of mechanical separation and/or a loss of bond.

"fully bonded" means that bonded surfaces are in adherent contact with each other such that and at least one of the bonded surfaces (e.g., the bonded surface of the optical sheet, of the bonding sheet, of the glazing component, etc.) is damaged, when the surfaces are separated with only mechanical force. For example, a glazing for automotive window applications is typically fully bonded together using an autoclave process. Such a glazing is considered fully bonded together when it is bonded together enough to satisfy the standard requirements of the automotive industry, or the specific requirements of a particular automobile manufacturer, for the corresponding glazing (e.g., windshields, backlights, sidelights, etc.).

"non-metallic multi-layer optical film" refers to a multiple layered film having optical properties that are not provided by layers of elemental metal or metal compounds.

"translucent" refers to a characteristic of material that allows at least some amount of visible light to pass therethrough.

"transparent" refers to a characteristic of a laminate such as, for example, a glazing that allows enough light to pass therethrough to satisfy the visible light transmission requirements of the particular laminate application (e.g., vehicular or architectural glazing applications).

"trimming" refers to various possible operations for removing a portion of a material (e.g., the peripheral edge of an optical sheet, bonding sheet, etc.). For example, performing such an operation with a cutting instrument such as, for example, a laser, a sharp blade, a die (e.g., steel or rule), an abrader, a burring tool, an ultrasonic horn or a combination thereof.

BRIEF DESCRIPTION OF THE DRAWINGS

Like reference symbols in the various drawings generally indicate like elements.

DETAILED DESCRIPTION OF THE PREFERRED EMBODIMENTS

The present invention provides glazing and intermediate laminates that are prepared so as to at least reduce the likelihood of, if not eliminate, significant delamination along a peripheral edge of an optical sheet comprising a non-metallic multi-layer optical film (e.g., an IR reflective film). Methods of making these laminates that are useful in window structures are also provided.

A number of challenges have been encountered by the applicants in making a laminate suitable for a window structure using an optical sheet comprising a non-metallic multi-layer optical film (e.g., an IR reflective film).

Figure 1:
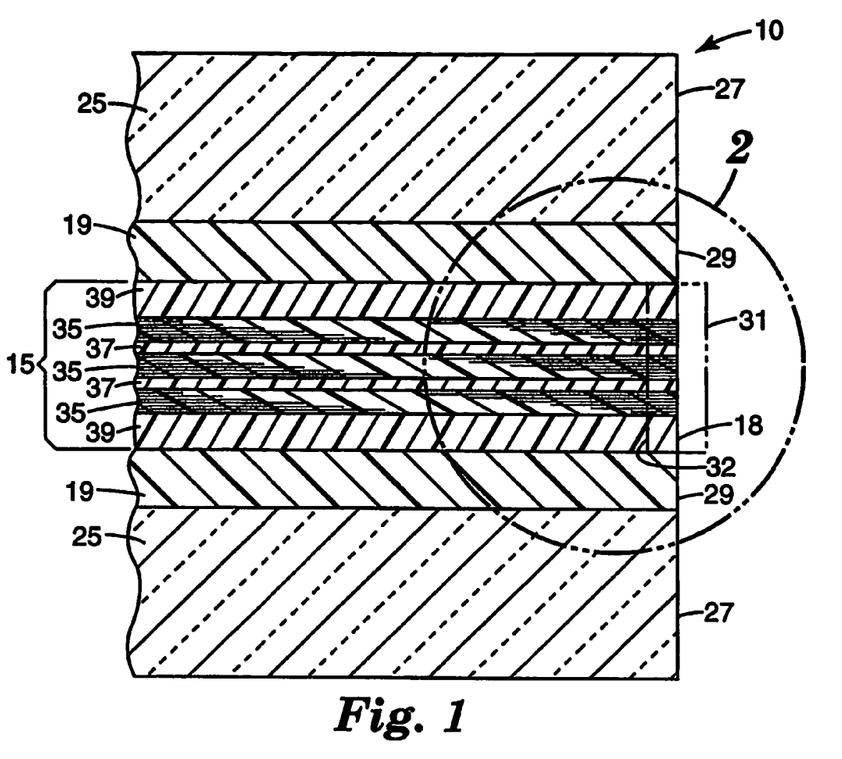
FIG. 1 is a sectional view of a portion of the peripheral edge of an exemplary glazing laminate with the corresponding portion of the peripheral edge of its optical sheet being substantially co-extensive with both of its glazing components, according to the present invention.
Figure 2:
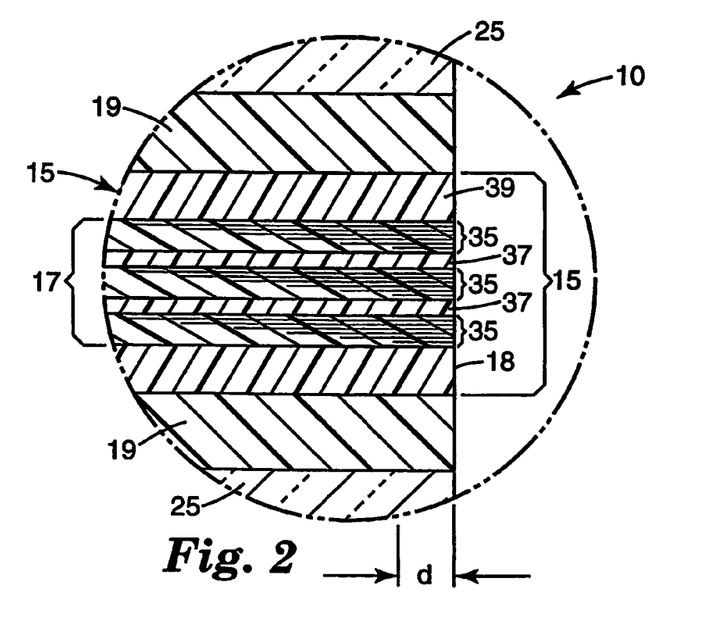
FIG. 2 is an enlarged view of the circled portion 2 of FIG. 1.

Referring to FIGS. 1 and 2, a glazing laminate 10 according to the present invention can include an optical sheet 15 having a non-metallic multi-layer optical film 17. In this embodiment, the optical sheet 15 and the optical film 17 have the same peripheral edge 18. The sheet 15 may also include other structures such as, for example, one or more outer protective layers 39, as well as additional functional layers (not shown). Such additional functional layers may include, for example, vibration dampening film, solar absorbing layers (e.g., tinting), etc.

The sheet 15 is sandwiched between two bonding sheets 19 that, in turn, are sandwiched between two glazing components 25, in a layered manner so as to bond the optical sheet 15 therebetween. Each bonding sheet 19 is used to adhere the optical sheet 15 to a major surface of the corresponding glazing component 25. Preferably, the optical sheet 15 is positioned so as to be at least generally co-planar with this major surface of the glazing component 25. The bonding sheets 19 may be different but are typically the same (e.g., sheets of PVB). The glazing components 25 may also be different but are typically the same (e.g., plastic or glass sheets). The illustrated portion of the peripheral edge 18 of the optical film 17 is depicted as being co-extensive or flush with a corresponding portion of the peripheral edge 27 of each of the two glazing components 25, as well as with a corresponding portion of the peripheral edge 29 of each of the bonding sheets 19. All, substantially all or a substantial portion of the peripheral edge 18 of the optical film 17 may also be substantially co-extensive with a corresponding portion of the peripheral edge 27 of the glazing components 25. A portion of the peripheral edge of the optical sheet or the optical film is considered co-extensive with a corresponding portion of the peripheral edge of the glazing component when that portion of the peripheral edge of the optical sheet or the optical film is flush with the corresponding portion of the peripheral edge of the glazing component. In addition, a portion of the peripheral edge of the optical sheet or the optical film is considered substantially co-extensive with a corresponding portion of the peripheral edge of the glazing component when that portion of the peripheral edge of the optical sheet or the optical film does not extend beyond (see phantom line 31) or fall within (see phantom line 32) the corresponding portion of the peripheral edge of the glazing component an aesthetically unacceptable amount. For example, when the laminate is installed and the corresponding portion of the peripheral edge of the glazing component(s) is exposed at least part of the time (e.g., when a vehicle side window is rolled down or otherwise opened, the top edge of the glazing can be visible), it may be aesthetically acceptable for the portion of the peripheral edge of the optical sheet or the optical film to extend up to 2 mm beyond (e.g., see reference number 31 in FIG. 1), or fall up to 5 mm within (e.g., see reference number 32 in FIG. 1), the corresponding portion of the peripheral edge of the glazing component.

One or both of the bonding sheets can comprise any suitable bonding material including a material selected from the group consisting of polyvinyl butyral, polyurethane, ionomer materials, and combinations thereof and may be initially transparent or translucent or may become transparent or translucent later in the lamination process.

Each of the glazing components can be transparent or translucent and can be made, for example, of such materials as glass, plastic or a combination thereof. Each glazing component can be in the form, for example, of a flat sheet, a curved sheet, a compound curved sheet, a lens, vary in thickness (e.g., have a decorative surface topography), etc. Each of the first bonding sheet and the second bonding sheet has a major surface that faces the major surface of one or the other of the glazing components such that the optical sheet is disposed between the first and second bonding sheets and the first and second bonding sheets are disposed between the glazing components. Once a final bonding operation has been performed, each of the first and second bonding sheets is fully bonded to its respective glazing component and the optical sheet. A fully bonded glazing laminate is one that is sufficiently bonded together to be suitable for use in its applicable window glazing (e.g., a window in an automobile, aircraft, watercraft or other vehicle and in a building or other architectural structure).

It has been found that the use of conventional methods of making glazing laminates can also cause an optical sheet to experience high shear and out-of-plane stresses that can result in delamination within the multiple layers of the optical film. Delamination within the multiple layers of the optical film can further result in other defects such as "sunbursts" or "wormy patterns". Further delamination producing defects can also be caused in the optical film during one or more of the de-airing, oven heating (tacking) and autoclave steps of conventional laminating processes for glazings. Problems that can occur during such processing can include, for example, fractures formed at the edge of the optical film when it is cut using a mechanical means (e.g., razor cutting on a plotter table). When the optical film is put under stress, the fractures can propagate to cause interlayer delamination of the optical film. Fractures may be considered as part of a larger class of defects, called "sites for subsequent delamination." These sites can generate problems after certain lamination processing steps such as, for example, one or more of deairing, being subjected to elevated temperature and/or pressure, etc. With the present invention, it is possible to successfully produce a glazing laminate without having to perform the trimming of the multi-layer optical film so as to significantly reduce, if not eliminate, fractures, ragged edges, rough-cut edges, cracks or other such defects in the peripheral edge of the optical film, where such defects are likely to produce a site for subsequent film delamination, after further processing of the laminate (e.g., fully bonding the glazing laminate). In other words, even if the optical film exhibits fractures, ragged edges, rough-cut edges, cracks or other such defects in its peripheral edge, the fusing of the peripheral edge of the optical sheet, or at least the optical film, can eliminate or at least reduce the likelihood and/or degree of film delamination that would otherwise result at such a site.

An optical sheet, and at least an optical film, used according to the present invention includes multiple layers that include optical layers and can include other layers such as, for example, structural or reinforcing layers and protective layers. For example, with the glazing laminate 10 of FIG. 2, the optical sheet 15 includes the optical film 17, which includes three stacks of infrared radiation reflecting layers 35 separated by two supporting layers 37, encased in the two outer protective layers 39. One or both of the two layers 39 can be made so as to also or alternatively exhibit functional features (e.g., solar energy absorbing properties). The optical sheet 15 may also include additional functional layers (not shown) located between one or both of the layers 39 and a corresponding bonding sheet 19.

It can be desirable for the multiple layers to be thermally or otherwise fused together along all, substantially all or at least the substantial portion of the peripheral edge of the optical sheet, or at least the optical film, so as to prevent or at least substantially reduce the occurrence or degree of delamination of the multiple layers along all, substantially all or the substantial portion of the peripheral edge of the optical film. The thermal fusing can be performed at the same time as the dimensioning operation, e.g., by cutting a peripheral edge for the optical sheet, or at least the optical film, with an instrument such as a heated blade, a focused or de-focused laser, etc.; or the thermal fusing can be performed by sufficiently heating a peripheral edge of the optical sheet, or at least the optical film, that was previously cut with, e.g., a mechanical cutting instrument like a knife blade or with an instrument like a heated blade or laser. The separate heating process may be necessary to insure sufficient fusing of the optical film peripheral edge, even when a heated blade or laser is used. The depth "d" of fused film can be on the order of at least about 10 microns within the optical sheet, and within at least the optical film, from its peripheral edge 18 (see FIG. 2). Satisfactory results have been obtained with an optical sheet, like that described for FIG. 2 and shown in FIG. 3, having its peripheral edge thermally fused to a depth d of about 40 microns.

In other words, the multiple layers of the optical sheet, and at least the optical film, are fused together to a sufficient depth "d" from its peripheral edge and to a sufficient degree that the multiple layers of the optical sheet, or at least the optical film, are prevented or at least less likely to delaminate along the portion of the peripheral edge that has been fused, during normal operating conditions and over the normal lifetime of the laminate. In addition, the degree of delamination along the peripheral edge, within the multiple layers of the optical sheet or at least the optical film, is considered substantially reduced when one or a combination of the following occurs: (a) the degree of delamination is not visible with normal (20/20) unaided eyesight, (b) any delamination that occurs remains hidden, or (c) the delamination occurs after the expected life of the corresponding glazing (e.g., the industry standard life expectancy for automobile glazings is typically a minimum of about 7 years, or typically more years for architectural glazings). Delamination along the peripheral edge, within the multiple layers of the optical film, is considered prevented when (a) no delamination is visible using a conventional visible light microscope, and (b) any delamination that is visible using a conventional visible light microscope occurs after the expected life of the corresponding glazing.

The fusing together of the peripheral edge of the optical sheet, or at least the optical film, can eliminate delamination of the optical film during or after the process of the laminate being fully bonded together (e.g., via an autoclaving process) and even after exposure to industry required durability testing. The following is a typical humidity test method used in the automotive industry for testing the durability of automotive glazings:

Humidity Test Method

Expose laminates to 14 days in a humidity chamber at 50 C and 95% relative humidity followed by 14 days in a room held at 23 C and 50% relative humidity. Repeat the 28 day cycle three times (84 days total). The conditions for the humidity chamber are specified in ANSI Z26.1 test 3.

The thermal characteristics of the materials used to make the optical sheet and optical film, as well as of the bonding material(s), can be used to determine how to adequately fuse the peripheral edge of a particular optical sheet or optical film and glazing laminate. For example, for thermal fusing, knowing the melting temperatures and thermal degradation temperatures (i.e., the temperature at which the material begins to chemically degrade) of the optical sheet materials and the bonding materials can help to ensure that the heating technique used will not cause excessive melting (e.g., to the point of the material being able to flow out of the glazing laminate) or degradation (e.g., charring or other degree of burning or other permanent degradation of the material) of either the optical sheet or bonding materials. Therefore, it is understood that with the teachings of the present invention it can be, at most, a matter of simple trial and error experimentation to determine an acceptable (a) heating temperature, (b) time at temperature, (c) distance between the heat source and the peripheral edge and (d) heating instrument to produce an optical sheet with an adequately fused peripheral edge.

Examples of Fusing

Figure 3:
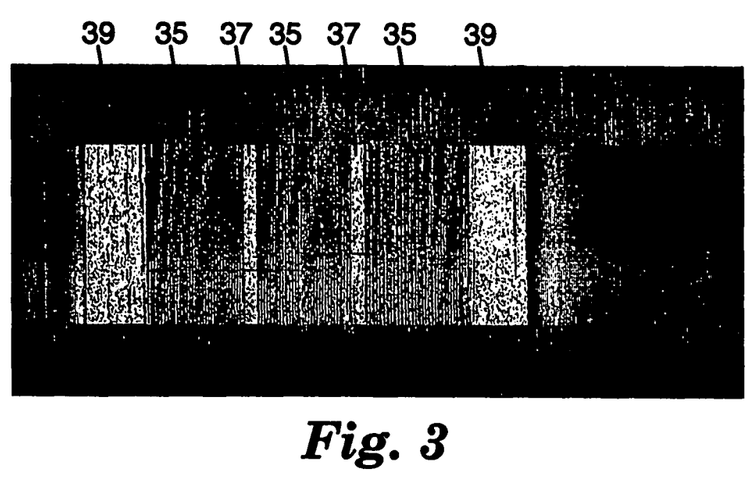
FIG. 3 is a photomicrograph of a sectional view of part of an exemplary vehicle glazing laminate, according to the present invention.

Four fully bonded glazing laminates, like that shown in FIGS. 1-3, were made as follows. An SRF optical sheet was sandwiched between two PVB bonding sheets. The resulting tri-laminate was dimensioned and sandwiched between two flat sheets of the same size glass glazing components such that all of the peripheral edge of the optical sheet and the two bonding sheets extended out beyond all of the peripheral edge of the two glazing components in the range of from about 0.125 to about 0.25 inches (about 0.492 to about 0.984 mm).

The resulting laminate was then autoclaved so as to fully bond the bonding sheets, optical sheet and glazing components together. The optical sheet and bonding sheets were then trimmed with a cutting blade (e.g., a razor blade) so that their peripheral edges were flush or substantially co-extensive with the peripheral edge of the glazing components. The peripheral edges of the resulting laminates were then thermally treated or fused as follows. The first laminate was not treated with heat, the second laminate was treated with heat from a lab hot air gun (approximate temp 750-850° F.), and the third laminate was treated with a propane torch (approximate temp 2370° F.). The treatment consisted of heating the peripheral edge of each glazing laminate with the hot air gun or the torch, where the hot air gun and the torch were each positioned a distance of about one inch (about 2.54 cm) from the peripheral edge and moved at an approximate rate of travel along the peripheral edge of about one to about two inches per second (about 2.54 to about 5.08 cm/sec). A fourth sample glazing laminate was assembled as above, but rather than trimming with a razor blade, this sample was trimmed with a 1000° F. hot knife at a rate of travel of about two inches per second (about 5.08 cm/sec).

Figure 4:
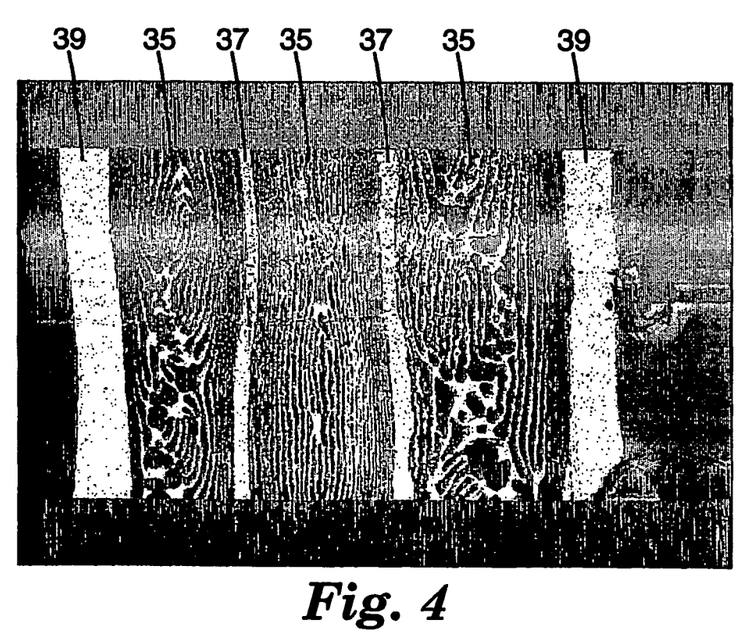
FIG. 4 is a photomicrograph of a sectional view of a part of an exemplary vehicle glazing laminate, like that of FIG. 4, with the multiple layers of the optical sheet being fused together, according to the present invention.

Laminates thermally treated with such a torch or hot knife treatment technique showed fusing of the multiple layers of the optical film similar in appearance as that shown in FIG. 4., with the optical layers 35 being intermingled and fused to the other layers 37 and 39 which remain relatively intact and co-planer. Laminates thermally treated with the hot air gun produced an appearance similar to that shown in FIG. 3, with visible fusing of only the outer surface of the peripheral edge of the SRF. These three types of thermally treated laminates exhibited no visible delamination after being subjected to the above described humidity test. The first sample laminate, without any thermal treatment, visibly delaminated after being subjected to the humidity test. Based on the above described results, it is believed that such co-mingling of the optical layers 35 is not necessarily required to prevent delamination of the peripheral edge 18 of the film 17 or sheet 15 and that the layers of the optical sheet need only be fused together and not intermingled in this manner.

While each of the above samples where trimmed and then thermally treated after the glazing laminate (i.e., the bonding sheets, optical sheet and glazing components) is fully bonded together, acceptable glazing laminates can also be made by performing the trimming and the thermal treating before the laminate is fully bonded together. In addition, the trimming operation can be performed so that at least the optical sheet, and preferably also the bonding sheets, are trimmed so that the desired portion of their peripheral edges are flush or substantially co-extensive with the peripheral edge of the glazing components. The trimming and thermal treating process can be performed simultaneously such as with a laser or heated cutting blade. Using a laser to perform the trimming and thermal treating can be particularly desirable.

It has been found that cutting the SRF with a laser can produce a fused peripheral edge that is similar in appearance to that shown in FIG. 4. When a laser is used to precut (i.e., before the fully bonded step) or otherwise trim at least the optical film or sheet, the optical film can be less likely to delaminate. The laser should be set to so as to cut completely through the optical sheet, and preferably through the bonding sheets as well. An exemplary laser that may be used is a 10.6 $\mu m$ $CO_2$ laser, available from Eurolaser (Hamburg, Germany) and Preco Laser, formerly Laser Machining Inc. (Somerset, Wis.). Exemplary parameters that can be used with such a 200 W nominal power rated laser from Eurolaser include a cutting speed of 250 mm/sec, at 100 Watts of power, 10 Hz frequency and the laser focused at the top of the trilaminate consisting of the optical sheet sandwiched between the two bonding sheets. Suppliers that provide suitable ultrasonic horns include Sonic and Materials, (Newton, Conn.) and Dukane (St. Charles, Ill.). A plotter table such as those supplied by Aristomat (Hamburg, Germany) or Zund (Altstatten, Switzerland) can also be used in the trimming operation.

Figure 5:
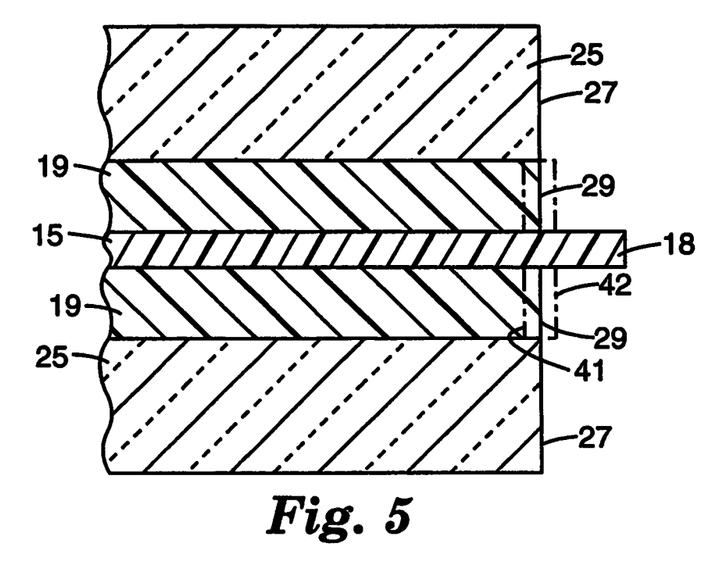
FIG. 5 is a sectional view of the peripheral edge of a laminate, according to the present invention, with an optical sheet temporarily or permanently extending beyond the peripheral edge of two glazing components and bonding sheets.

Referring to FIG. 5, all, substantially all or at least a remaining portion of the peripheral edge 18 of the optical sheet 15, or at least the optical film, (i.e., a portion of the peripheral edge that has not been fused or substantially fused) can be positioned so as to extend substantially beyond the peripheral edge 29 of both of the bonding sheets 19. It has been found that when a portion of the peripheral edge 18 of the optical sheet 15, or optical film, is maintained a substantial distance beyond the peripheral edge 29 of the bonding sheets 19, that portion of the optical sheet 15, or optical film, is less likely to delaminate, even when its multiple layers are not fused together. Therefore, it may not be necessary for any portion of the peripheral edge 18 of the optical sheet 15, or optical film, to be fused together. It may also be desirable for all, substantially all or at least a remaining portion of the peripheral edge 18 of the optical sheet 15, or at least the optical film, to be positioned so as to extend substantially beyond the peripheral edge 29 of both of the bonding sheets 19. With such a portion, the corresponding peripheral edge 29 of each of the bonding sheets 19 can be kept substantially co-extensive with, or can lie substantially within (see phantom line 41), the peripheral edge 27 of both of the glazing components 25 or at least the glazing component 25 to which the bonding sheet 19 is directly bonded. The peripheral edge 29 of the bonding sheet 19 is considered substantially co-extensive with a corresponding portion of the peripheral edge 27 of the glazing component(s) 25, when that portion of the peripheral edge 29 is co-extensive with or at least does not extend substantially beyond (see phantom line 42) the corresponding portion of the peripheral edge 27 of the glazing component(s) 25. The edge 29 extends substantially beyond the edge 27, when the corresponding portion of the peripheral edge 18 of the optical sheet 15, or optical film, is not a substantial distance beyond the peripheral edge 29 of the bonding sheets 19.

The more stress that is applied to the optical film, during the process of fully bonding the glazing laminate together (e.g., an autoclaving process) or that remains in the glazing laminate after the full bonding process, the more the peripheral edge 18 of the optical sheet 15, or at least the optical film, will need to extend beyond the peripheral edges 29 of the bonding sheets 19 in order to prevent or at least substantially reduce delamination of the optical film at its peripheral edge. Factors that can Influence Generated Stresses and Delamination:

The greater the degree of shrinkage of the optical film resulting from the full bonding process (e.g., an autoclaving process), the greater the potential stresses generated and the more likely delamination will result. The more complex the glazing components (e.g., flat versus complex curved glazing sheets), the greater the potential stresses generated and the more likely delamination will result. The parameter settings (e.g., temperature, time and pressure) used during the full bonding process can also affect the levels of the stresses generated and, thereby, increase the likelihood that the stresses generated will cause delamination.

Other mechanisms have been found that can cause delamination of the laminate (e.g., between the optical sheet and the bonding sheets) and/or the optical sheet (e.g., between the multiple layers of the optical sheet or optical film). In particular, preventing moisture penetration into the peripheral edge of the optical sheet, or at least the optical film, and preferably also the bonding sheet, has been found to at least reduce the likelihood and/or degree of delamination experienced by the optical sheet, or at least the optical film. Such moisture penetration can be prevented, or at least inhibited, by using a physical or chemical barrier such as a rubber gasket, silicone sealant, fluorinated surfactant or other technique or materials. Such delamination can occur when a PVB type bonding sheet material is used and the optical film glazing is exposed to heat and humidity. Though the location of the failure differs between the types of delamination, the mechanism for the failure is the same. Both experimental and modeling work has demonstrated that these types of delamination are caused by an accelerated loss of plasticizer due to the presence of moisture. As the laminate dries out, the plasticizer loss causes the Tg of the PVB to increase and the PVB to shrink. This results in an increase in residual stress in the glass laminate, which can cause delamination. The delamination typically occurs at the weakest interface first. In the case of delamination within the optical sheet, the weakest interface is typically between the layers of the optical film. When the cut or trimmed peripheral edge of the optical film is inside the glazing laminate (i.e., when the peripheral edge of the optical film does not extend substantially beyond the peripheral edge of at least one of the bonding sheets), the residual stress is more likely to cause separation to occur between the optical layers at fracture sites (e.g., sites caused by the trimming operations). In the case of delamination between the optical sheet and the PVB, the weakest interface is the PVB/optical sheet interface. The stronger the bond between the optical sheet and the PVB, the less susceptible the laminate will be to this type of delamination. It may also be possible to prevent delamination by using a barrier that prevents plasticizer loss such as, for example, a rubber gasket, silicone sealant, fluorinated surfactant or other suitable technique or materials. This barrier may still allow moisture to enter the laminate, but prevent plasticizer from leaving thereby preventing delamination.

When an optical sheet is made into a glazing laminate such as, for example, an automotive windshield (front window) or backlight (rear window), and some side lights (side windows), using conventional techniques, the optical sheet is sandwiched between two bonding sheets (e.g., two pieces of PVB, etc.) and two glazing components (e.g., two sheets of glass and/or plastic, etc.). The optical sheet, or at least the optical film, is then trimmed flush with the entire peripheral edge of the two sheets of glass. An autoclave step, or similar process, is often used next to fully bond the glazing laminate together. During autoclaving, which is typically conducted at a temperature of about 140° C. and a pressure of about 12 bar, the optical film tends to shrink and conform to the curvature of the glass. However, as the optical film shrinks stresses can be generated between the optical film and the bonding sheets which can lead to delaminations forming along the peripheral edge of the optical film.

The glazing laminates of the present invention are minimally susceptible to, if not free of, peripheral edge delamination of the optical film.

Glass sheeting is a preferred glazing component, especially for vehicle window structures. There are of course, other substantially clear materials that can be used as glazing components to provide rigidity and strength to an optical sheet. These alternative materials include polymeric materials such as, for example, acrylic, polyethylene teraphthalate (PET) or polycarbonate. A glazing component can be substantially planar or have some curvature. It can be provided in various shapes, such as a dome, conical, or other configuration, and cross-sections, with a variety of surface topographies. The present invention is not intended to necessarily be limited to the use of any particular glazing component material(s) or structure.

A glazing component that has some curvature may be particularly prone to exhibiting delamination along a peripheral edge of the optical film. This can be due to the stresses imposed on the optical film that force the film to fit to a curved surface. Stresses resulting in delamination may also arise if glazing component pairs are misaligned or misshaped, or if a glaze component is poorly handled during the lamination processing.

Suitable optical sheets comprise a non-metallic multi-layer optical film such as, for example, that described in U.S. Pat. Nos. 6,207,260; 6,157,490; 6,049,419; 5,882,774; 5,360,659; 5,223,465; 5,103,557 and 5,103,337 (RE 34,605); in PCT Publications Nos. WO 99/36248, WO 01/96104, WO 02/061469 and WO 03/057479, all of which are incorporated herein by reference in their entirety. Suitable optical sheets of the present invention may include, but are not necessarily limited to, infrared reflecting films, polarized films, non-polarized films, multi-layer films, colored or tinted films, and decorative films.

Two suitable non-metallic multi-layer optical films described in the above-mentioned PCT Publication No. WO 01/96104 are (a) a birefringent dielectric multilayer film that reflects at least 50% of light in a band at least 100 nm wide in a wavelength region of interest, wherein the film is heat set at a temperature sufficient to render the film capable of shrinking to conform without substantial wrinkling to a substrate having a compound curvature and (b) birefringent dielectric multilayer film that reflects at least 50% of light in a band at least 100 nm wide in a wavelength region of interest, wherein the film is heat set at a temperature sufficient to enable the film to shrink at least about 0.4% in both in-plane directions upon heating.

To reflect over a wide band, the various layers in the birefringent dielectric multilayer films preferably have varying relative thicknesses, referred to herein as a layer thickness gradient, which are selected to achieve the desired bandwidth of reflection. In one embodiment, the layer thickness gradient may be linear, in which the thickness of the layer pairs increases at a constant rate across the thickness of the films, so that each layer pair is a certain percent thicker than the thickness of the previous layer pair. In another embodiment, the layer thickness may decrease, then increase, then decrease again from one major surface of the films to the other, or may have an alternate layer thickness distribution designed to increase the sharpness of one or both bandedges, as described in U.S. Pat. No. 6,157,490.

In another embodiment, the birefringent dielectric multilayer films include an extended bandedge two component IR reflecting film construction having a six layer alternating repeating unit as described in U.S. Pat. No. 5,360,659. This construction suppresses the unwanted second, third, and fourth order reflections in the visible wavelength region of between about 380 to about 700 nm, while reflecting light in the infrared wavelength region of between about 700 to about 2000 nm. Reflections higher than fourth order will generally be in the ultraviolet, not visible, region of the spectrum or will be of such a low intensity as to be unobjectionable. The film comprises alternating layers of first (A) and second (B) polymeric materials in which the six layer alternating repeat unit has relative optical thicknesses of about .778A.111B.111A.778B.111A.111B. The use of only six layers in the repeat unit results in more efficient use of material and is relatively easy to manufacture. In this construction, it is again desirable to introduce a repeat unit thickness gradient across the thickness of the film.

In yet another embodiment, the two component birefringent dielectric multilayer films may comprise a first portion of alternating layers comprising the six layer alternating layer repeating unit which reflects infrared light of wave lengths between about 1200-2000 nm and a second portion of alternating layers having an AB repeat unit and substantially equal optical thicknesses which reflect infrared light of wavelengths between about 700-1200 nm. Such a combination of alternating layers is called a hybrid design and results in reflection of light across the infrared wavelength region. The layer thicknesses of both portions of alternating layers can be adjusted to place the reflecting band within the infrared spectrum so as to minimize any perceived color change with angle.

The birefringent dielectric multilayer optical films may also include more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited.

In an alternate embodiment, birefringent dielectric multilayer films including more than two distinguishable polymers can be made. This extends the reflecting band further into the IR to increase the amount of IR reflection while minimizing color in the visible region of the spectrum, which results from reflection due to higher order harmonics. Examples of such films include those described in U.S. Pat. No. RE 34,605. The RE '305 patent describes a multilayer optical interference film including three diverse substantially transparent polymeric materials, A, B, and C and having a repeating unit of ABCB. The layers have an optical thickness of between about 90 nm to about 450 nm, and each of the polymeric materials has a different index of refraction, $n_i$.

To produce a birefringent dielectric multilayer film that reflects a broad bandwidth of wavelengths in the solar infrared range (e.g., reflection at from about 700 to about 2000 nm), a layer thickness gradient is introduced across the thickness of the film, and the layer thicknesses preferably increase monotonically across the thickness of the film. Preferably, for a three component system, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials. Any or all of the polymeric materials may be synthesized to have the desired index of refraction by utilizing a copolymer or miscible blend of polymers.

Another useful film design is described in U.S. Pat. No. 6,027,260. Optical films and other optical bodies are described which exhibit a first order reflection band for at least one polarization of electromagnetic radiation in a first region of the spectrum while suppressing at least the second, and preferably also at least the third, higher order harmonics of the first reflection band, while the percent reflection of the first order harmonic remains essentially constant, or increases, as a function of angle of incidence.

This is accomplished by forming at least a portion of the optical body out of polymeric materials A, B, and C which are arranged in a repeating sequence ABC, wherein A has refractive indices $n_x^A$, $n_y^A$, and $n_z^A$ along mutually orthogonal axes x, y, and z, respectively, B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively, where axis z is orthogonal to the plane of the film or optical body, wherein $n_x^A > n_x^B > n_x^C$ or $n_y^A > n_y^B > n_y^C$, and wherein $n_z^C \geq n_z^B \geq n_z^A$. Preferably, at least one of the differences $n_z^A - n_z^B$ and $n_z^B - n_z^C$ is less than or equal to about −0.05.

By designing the film or optical body within these constraints, at least some combination of second, third and fourth higher-order reflections can be suppressed without a substantial decrease of the first harmonic reflection with angle of incidence, particularly when the first order reflection band is in the infrared region of the spectrum.

In an alternate embodiment, the birefringent dielectric multilayer films may comprise a first portion of alternating layers comprising a multicomponent optical design that reflects infrared light of wavelengths between about 1200-2000 nm while minimizing higher order reflections that contribute to visible color, and a second portion of alternating layers having an AB repeat unit and substantially equal optical thicknesses which reflect infrared light of wavelengths between about 700-1200 nm. This hybrid design may be provided as described, for example, in U.S. Pat. No. 5,360,659, but has broader application in that it is useful with any of the multicomponent optical designs described herein. The layer thicknesses of both portions of alternating layers can be adjusted to place the reflecting band within the infrared spectrum to minimize any perceived color change with angle.

The first and second optical layers and the optional non-optical layers of the birefringent dielectric multilayer films are typically composed of polymers such as, for example, polyesters. The term "polymer" will be understood to include homopolymers and copolymers, as well as polymers or copolymers that may be formed in a miscible blend, for example, by coextrusion or by reaction, including, for example, transesterification. In general, the use of comonomers should not substantially impair the stress optical coefficient or retention of birefringence after stretching. In practice, these restrictions impose an upper limit on the comonomer content, the exact value of which will vary with the choice of comonomer(s) employed. Some compromise in optical properties may be accepted, however, if comonomer incorporation results in improvement of other properties. The terms "polymer", "copolymer", and "copolyester" include both random and block copolymers.

Polyesters for use in the multilayer reflective mirrors and polarizers of the present invention generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid;

2,2'-biphenyl dicarboxylic acid and isomers thereof; and lower alkyl esters of these acids, such as methyl or ethyl esters. The term "lower alkyl" refers, in this context, to C1-C10 straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

A polyester useful in the birefringent dielectric multilayer films is polyethylene naphthalate (PEN), which can be made, for example, by reaction of naphthalene dicarboxylic acid with ethylene glycol. Polyethylene 2,6-naphthalate (PEN) is frequently chosen as a first polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Other semicrystalline naphthalene dicarboxylic polyesters suitable as first polymers include, for example, polybutylene 2,6-Naphthalate (PBN), polyethylene terephthalate (PET), and copolymers thereof. Non-polyester polymers are also useful in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used. Suitable first polymers are described, for example, in WO99/36248, WO99/36262; WO 01/22130, and U.S. Ser. No. 09/444,756.

A preferred first polymer is a coPEN derived with carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. The index of refraction is approximately 1.63. The polymer is herein referred to as low melt PEN (90/10). Another preferred first polymer is a PET having an inherent viscosity of 0.74 dL/g, available from Eastman Chemical Company (Kingsport, Tenn.).

The other required polymer, referred to herein as the second polymer, should be chosen so that in the finished film, the refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest. It will be understood from the foregoing discussion that the choice of a second polymer is dependent not only on the intended application of the multilayer optical film in question, but also on the choice made for the first polymer, as well as processing conditions.

The second optical layers can be made from a variety of second polymers having glass transition temperature compatible with that of the first polymer and having a refractive index similar to the isotropic refractive index of the first polymer. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Preferred second polymers are homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional preferred second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc., Houston, Tex. under the trade designation Solef 1008. Yet other preferred second polymers include polyolefin copolymers such as poly (ethylene-co-octene) (PE-PO) available from Dow-Dupont Elastomers under the trade designation Engage 8200, poly (propylene-co-ethylene) (PPPE) available from Fina Oil and Chemical Co., Dallas, Tex., under the trade designation Z9470, and a copolymer of atatctic polypropylene (aPP) and isotatctic polypropylene (iPP) available from Huntsman Chemical Corp., Salt Lake City, Utah, under the trade designation Rexflex W111. Second optical layers can also be made from a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

Particularly preferred combinations of first/second polymers for optical layers in IR reflective mirrors include PEN/PMMA, PET/PMMA or PET/coPMMA, PEN/Ecdel, PET/Ecdel, PEN/sPS, PET/sPS, PEN/coPET, PEN/PETG, and PEN/THV. Ecdel is a trade designation for a copolyester ether elastomer available from Eastman Chemical Company (Kingsport, Tenn.). THV is a trade designation for a fluoropolymer commercially available from 3M Company, St. Paul, Minn. PMMA refers to polymethyl methacrylate, coPET refers to a copolymer or blend based upon terephthalic acid (as described above), and PETG refers to a copolymer of PET employing a second glycol (usually cyclohexanedimethanol). sPS refers to syndiotactic polystyrene.

For mirror films, a match of the refractive indices of the first polymer and second polymer in the direction normal to the film plane is preferred, because it provides constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel system, in which the analogous indices might be 1.66 and 1.51 for PET, while the isotropic index of Ecdel might be 1.52.

The above birefringent dielectric multilayer optical films can be made according to WO99/36248. These films solve the problems of cracking that are typically seen when metalized solar rejection films are nip roll laminated to glazings having compound curvature. The films may wrinkle during nip roll lamination, however, especially when applied to large laminates and/or glazings with severe compound curvatures. In another aspect of the present invention, the process conditions can be controlled to produce a film with improved shrinkage properties, resulting in a film that does not wrinkle during the nip roll lamination process.

Techniques for manufacturing polymeric multilayer films are described in detail in WO99/36248. Following extrusion and layer formation, the film is cooled on a casting wheel to form a web. The web is then stretched longitudinally (along the web path, or in machine direction, MD) and transversely (across the web path, or in transverse direction, TD) sequentially in a length orienter (LO) and in a tenter. The stretch ratios are determined with reference to the optical and mechanical properties required for a particular application. In a typical LO, the web is preheated between temperature-controlled rollers to a temperature less than the Tg of the first polymer in the film construction. The web is then stretched in a stretch gap under IR lamps that heat the web to a temperature higher than the Tg of the first polymer. The LO oriented film is cooled over cold rollers and is then fed into a tenter.

A tenter typically has four zones, pre-heat, stretch, heatset and cooling zones. Each of these zones may have sub-zones. Length oriented film enters the tenter pre-heat zone and is clipped in chains on each edge of the film. The chains move at the speed of the film. The preheated film moves into the stretch zone where the chains diverge (controlled by rail positions) and is stretched in the transverse direction. The stretched film then passes through the heatset zones to impart additional crystallinity in the film and establish its shrinkage and other mechanical properties before exiting the tenter through a cooling zone. The fully oriented film is finally trimmed and wound on a winder.

If the non-planar substrate to which the film is to be laminated has a specific shape or curvature, to reduce wrinkling the shrinkage of the film may be individually controlled in each in-plane direction. If the curvatures along two principal axes of a region of the substrate are not equal, to laminate the film to that region without wrinkles, the shrinkage of the film may be controlled such that it differs in each in-plane direction. The in-plane direction of the film with the greater shrinkage should be aligned with the dimension of the substrate having the greater curvature.

For example, to achieve substantially wrinkle-free lamination to a non-planar, curved or compound curved substrate, for a PEN or PET based film the shrinkage is greater than about 0.4% in both in-plane directions, preferably greater than about 0.7% in at least one in-plane direction, and more preferably greater than about 1% in at least one in-plane direction. The shrinkage should be maintained at a minimum to reduce edge delamination. This phenomenon is called a "pull-in." So, the shrinkage is preferably less than about 3% in each in-plane direction, more preferably less than about 2.5% in each in-plane direction.

To introduce shrinkage into the film, for a similar residence time, the tenter heatset temperature is reduced, compared to the heatset temperature for a film intended for lamination to a planar substrate. However, this reduced heatset temperature may result in lower interlayer adhesion. The goal is to find process conditions that balance this trade-off and provide increased shrinkage in combination with acceptable interlayer adhesion.

To minimize shrinkage, it is desirable to select heatset conditions, such as, for example, temperature and/or residence time, that maximize crystal growth rate after the film is oriented. This temperature depends on the materials in the film and is typically between the glass transition temperature and melt temperature of the polymer in the film that has the highest Tg in the construction, typically the first polymer and/or the polymer making up the skin layers, referred to herein as the dominant polymer. As mentioned above, the skin layers can be the same polymer as the first polymer or can be a different polymer. However, the Tg of the skin layers is preferably either equal to or less than the Tg of the first polymer.

For example, typical heatset conditions for PEN based multilayer IR mirror films intended for lamination to a planar substrate are about 249° C. To control shrinkage and provide a film suitable for wrinkle free lamination to a non-planar substrate, the heat set temperature for a PEN based multilayer IR mirror film should be reduced to about 199° C. to about 204° C., preferably about 202° C., for about 10 seconds. The heat set temperature for a PET based multilayer IR mirror film suitable for lamination to a non-planar substrate should be about 227° C. to 243° C., preferably about 235° C. to about 241° C. for about 10 seconds.

In addition to the heatset temperature and residence time, another parameter that affects film shrinkage is toe-in. Toe-in is defined as the decrease in rail spacing in the tenter heatset zone measured relative to a maximum rail setting. For example, if maximum width of the film is 170.2 cm at the end of the stretch zone, and film width in the heatset zone is 165.1 cm, then the toe-in is 5.08 cm. The first rail in the heatset zone is preferably set between the maximum rail setting and the rest of the heatset zone rail settings to ensure a smooth transition. However, tenter rail configuration and tenter width may vary widely, and ideal rail settings must be determined experimentally in each case.

Toe-in affects the shrinkage in both in-plane directions, TD and MD. In addition, there are non-linear interactions between toe-in and heatset temperature for shrinkage properties. The measured shrinkage value is also a strong function of temperature and time used in the measurements. The non-linearity between the measured shrinkage values and heatset temperature and toe-in can be very different for different measurement conditions. In the present application, shrinkage properties are measured using a standard test condition of 150° C. for 15 minutes.

Again, the toe-in required depends on the materials in the film, on the intended application and on the heatset temperatures and residence times. Either one or the other or both heat set temperature and the toe-in may be varied to control the shrinkage in the film. For example, for a PEN based multilayer IR mirror film, a statistical model predicts that to get MD shrinkage of about 1% and TD shrinkage of about 2%, the tenter heat set temperature should be about 202° C. for about 10 seconds and the toe-in should be about 1.27 cm to about 2.54 cm from a maximum rail setting of about 177.8 cm.

To control shrinkage and provide a film suitable for wrinkle free lamination to a non-planar substrate, the toe-in should be adjusted depending on the polymer used. For a PEN based multilayer IR mirror film, the toe-in should be about 0 to 3.81 cm, preferably about 1.27 to 2.54 cm at the preferred heatset temperature, film width and heatset zone residence times mentioned above. For a PET based multilayer IR mirror film, the toe-in should be about 0 to 5.08 cm, preferably about 0 to 3.81 cm at the preferred conditions described above.

The multilayer IR film may be coated with a primer to promote adhesion to the PVB. Coatings may change the shrinkage properties of a film. Typically, a primer coating may reduce TD shrinkage by about 0.2% to about 0.4% and increase MD shrinkage by about 0.1 to about 0.3%. The amount of change depends on the drying temperature of the coater oven, as well as on film tension and residence time in the heatset zone.

A bonding sheet is at least used to bond together an optical sheet and a glazing component. In preferred laminates and glazing structures, the bonding sheet is a polymeric film, such as an energy or shock dissipating layer. These types of films can assist in bonding the glazing component to the optical sheet, as well as impart a protective feature (e.g., anti-spall, anti-lacerative), a feature often desired for vehicular glazings (e.g. windshields and sideglass). Suitable materials for the bonding sheet can include for example, polyvinylbutyral (PVB), an ionoplast, or polyurethane. Commercially available PVB bonding sheet materials may include those, for example, from E.I. DuPont deNemours, Co., (Wilmington, Del.) under the trade designation BUTACITE; from Solutia Inc. (St. Louis, Mo.) under the trade designation SAFLEX; from Sekisui Chemical Co. Ltd (Osake, Japan) under the trade designation S-LEC; and from H. T. Troplast (Troisdorf, Germany) under the trade designation TROSEFOL. Commercially available ionoplast bonding sheet materials may include those, for example, from E.I. DuPont deNemours, Co., (Wilmington, Del.) marketed under the trade designation SENTRY GLAS PLUS (ionoplast). Examples of suitable ionomer materials may include the ionoplast interlayer used in the DuPont laminated glass products marketed under the trademark designation SentryGlas® Plus, as well as other ionomer-class materials such as the ionomer resins marketed by DuPont under the trademark designation Surlyn®. Commercially available polyurethane bonding sheet materials may include those, for example, from Huntsman Polyurethanes (Morton) and available through Polymar bvba, Brasschaat, Belgium under the trade designation KRYSTAL-FLEX.

Alternative bonding sheets may also include, for example, a layer or coating of an adhesive or tape. The bonding sheet may be substantially continuous, or partially discontinuous. The bonding sheet is preferably provided in a sufficient amount to form a bond between an optical layer and a glazing component. The present invention is not intended to necessarily be limited to the use of any particular bonding sheet material(s) or structure.

Laminate components can be exposed to elevated temperature for a sufficient time to allow the bonding sheet to soften, thereby creating a bond between the optical sheet and the glazing components. The bonding sheet can also be subjected to sufficient heat and for a long enough time to cause the bonding sheet material to flow and encapsulate the co-extensive or substantially co-extensive portion of the peripheral edge of the optical sheet, or at least the optical film. Optionally, a sealant such as, e.g., a polyurethane composition, can be applied around the peripheral edge of the glazing laminate, either before or after the final lamination process so as to encapsulate all of or a desired portion of the peripheral edge of the glazing laminate, the peripheral edge of the bonding sheet, or the co-extensive or substantially co-extensive portion of the peripheral edge of the optical sheet, or at least the optical film.

The laminates of the invention can be cut, shaped, or otherwise sized for use in architectural or vehicle window structures. Particularly useful applications of the inventive laminates are in vehicular glazing structures such as for example, backlights, sidelights, and windshields. In vehicular windshields, the glazing laminate can optionally be designed so that all, substantially all or at least a substantial portion of its peripheral edge lies within a darkened area known as the "frit." A frit is typically applied on the surface of a windshield. A common frit pattern is a solid black border around a portion, or all, of the periphery of the windshield. A popular design is a pattern that starts as a solid black pattern at the peripheral edge of the windshield and gradually becomes a pattern of smaller dots as the distance from the peripheral edge of the windshield increases. Placing the peripheral edge of an optical sheet and/or its optical film within the frit design (e.g., within the solid black portion) can "hide" the peripheral edge to provide an aesthetically pleasing product, even when there is evidence of the delamination along the peripheral edge. It can be desirable to have a black frit design on both glazing components in an effort to more completely hide the peripheral edge of the optical sheet.

One or both surfaces of an optical sheet used in the laminates of the present invention may be modified to enhance their adhesion to the bonding sheets. Suitable techniques may include, for example, corona treatment, plasma treatment, flame treatment, etching, use of organic or inorganic primers such as that disclosed in PCT Patent Publication No. WO 03/016047 (Application No. US02/25837, filed Aug. 14, 2002) and which is incorporated herein by reference in its entirety, or any other suitable surface modifying techniques.

Test Method

Observing Delamination

Sample glazing laminates can be inspected for delamination by viewing the peripheral edge of the optical sheet at a distance of about 0.3 to 0.9 meters in transmitted light (using an unaided eye). Fluorescent bulbs can be used as the light source. Any visible delamination (mechanical separation) between layers was considered unacceptable.

Examples

In making exemplary glazing laminates according to the present invention the following items can be used:

| | |
|---|---|
| TYZOR™ TPT | A tetraisopropyl titanate (TPT) primer, available from E.I. DuPont deNemours & Co. (Wilmington, DE) |
| SAFLEX AR 11 | 0.38 mm polyvinyl butyral (PVB) available from Solutia Inc., (St. Louis, MO) |
| SRF | Solar Reflecting Film (SRF), a multi-layer optical film made by Minnesota Mining and Manufacturing Company.* |
| Autoclave | Scholz Maschinenbau GmbH & Co. KG (Coesfeld, Germany) or Melco Steel Inc. (Azusa, California) |

*In accordance with the teachings, for example, of one or more of U.S. Pat. Nos. 5,360,659 and 6,157,490, and PCT Publications Nos. WO 99/36248, WO 01/96104, and WO 02/061469.

Typically, the PVB does not become sufficiently transparent until after being heated to the point of fully bonding to the SRF and its corresponding glazing component. In addition, each pair of glazing components used to make a windshield were made of glass and generally equal in size (i.e., the peripheral edge of one did not extend substantially beyond the peripheral edge of the other.).

A number of embodiments of the invention have been described herein. Nevertheless, it will be understood that various modifications may be made without departing from the spirit and scope of the invention. Accordingly, other embodiments are within the scope of the following claims.

What is claimed is:

1. An optical sheet suitable for use in a laminate comprising at least one glazing component having a peripheral edge, said optical sheet comprising a non-metallic multi-layer optical film having optical properties that are not provided by layers of elemental metal or metal compounds, said optical film including a stack of at least 100 optical layers, said optical film having multiple layers and a peripheral edge, and said multiple layers being fused together therebetween along a substantial portion of only the peripheral edge of said optical film so as to at least substantially reduce delamination of said multiple layers along at least said substantial portion of the peripheral edge of said optical film, wherein a remaining portion of said multiple layers, other than said substantial portion of the peripheral edge, is not fused so as to at least substantially reduce delamination of said multiple layers, and wherein said optical film is at least one of (a) a birefringent dielectric multilayer film that reflects at least 50% of light in a band at least 100 nm wide in a wavelength region, wherein the film is heat set at a temperature sufficient to render the film capable of shrinking to conform without substantial wrinkling to a substrate having a compound curvature or (b) a birefringent dielectric multilayer film that reflects at least 50% of light in a band at least 100 nm wide in a wavelength region, wherein the film is heat set at a temperature sufficient to enable the film to shrink at least about 0.4% in both in-plane directions upon heating.

2. The optical sheet according to claim 1, wherein said multiple layers are fused together along all of only the peripheral edge of said optical film so as to at least substantially reduce delamination of said multiple layers along substantially all of the peripheral edge of said optical film.

3. A laminate comprising:
the optical sheet according to claim 1, with said optical sheet having a first major surface, a second major surface and a peripheral edge;
a first bonding sheet having a first major surface, a second major surface and a peripheral edge, said first bonding sheet being suitable for bonding to a glazing component, having a major surface and a peripheral edge, and to said optical sheet, and the first major surface of said optical sheet and the first major surface of said first bonding sheet being positioned together;
a second bonding sheet having a first major surface, a second major surface and a peripheral edge, the first major surface of said second bonding sheet being positioned relative to the second major surface of said optical sheet such that said optical sheet is disposed between said first bonding sheet and said second bonding sheet, and said second bonding sheet being suitable for bonding to the major surface of another glazing component; and
a first glazing component and a second glazing component, each of said glazing components having a major surface and a peripheral edge,
wherein the second major surface said first bonding sheet faces the major surface of said first glazing component and the second major surface of said second bonding sheet faces the major surface of said second glazing components, said optical sheet is disposed between said first and second bonding sheets, said first and second bonding sheets are disposed between said glazing components, and at least said substantial portion of the peripheral edge of said optical film is positioned so as to be substantially co-extensive with a corresponding portion of the peripheral edge of at least one of said glazing components.

4. The laminate according to claim 3, wherein each of said first and second bonding sheets is fully bonded to said optical sheet and to its respective glazing component.

5. The laminate according to claim 3, wherein the peripheral edge of said optical film is positioned so as to be substantially co-extensive with the peripheral edge of both of said glazing components.

6. The laminate according to claim 3, wherein at least a substantial portion of the peripheral edge of said optical film is positioned so as to extend substantially beyond the peripheral edge of both of said bonding sheets, and the peripheral edge of each of said bonding sheets is substantially co-extensive with or lies substantially within the peripheral edge of both of said glazing components.

7. The laminate according to claim 4, wherein at least said substantial portion of the peripheral edge of said optical film is not encapsulated within bonding sheet material.

8. The laminate according to claim 4, wherein said laminate is a glazing suitable for use in a vehicle window.

9. The laminate according to claim 4, wherein said multiple layers along all of the peripheral edge of said optical film are fused together.

10. The laminate according to claim 9, wherein all of the peripheral edge of said optical film is not encapsulated within bonding sheet material.

11. The laminate according to claim 1, wherein said substantial portion of the peripheral edge of said optical film is fused to a depth "d" of at least about 10 microns into said multiple layers.

12. The laminate according to claim 1, wherein said multiple layers are fused together to a depth "d" into said multiple layers, along said substantial portion of the peripheral edge of said optical film, so as to be intermingled, while the remaining portion of said multiple layers remain relatively intact and co-planer.

13. The optical sheet of claim 1, wherein said optical film is a birefringent dielectric multilayer film that reflects at least 50% of light in a band at least 100 nm wide in a wavelength region, wherein the film is heat set at a temperature sufficient to render the film capable of shrinking to conform without substantial wrinkling to a substrate having a compound curvature.

14. The optical sheet of claim 1, wherein said optical film is a birefringent dielectric multilayer film that reflects at least 50% of light in a band at least 100 nm wide in a wavelength region, wherein the film is heat set at a temperature sufficient to enable the film to shrink at least about 0.4% in both in-plane directions upon heating.

15. The optical sheet of claim 1, wherein said multiple layers are fused together to a depth "d" into said multiple layers.

16. An optical sheet suitable for use in a laminate comprising at least one glazing component having a peripheral edge, said optical sheet comprising a non-metallic multi-layer and birefringent dielectric optical film having optical properties that are not provided by layers of elemental metal or metal compounds, said optical film including a stack of at least 100 optical layers, said optical film having multiple layers and a peripheral edge, and said multiple layers being fused together therebetween along a substantial portion of only the peripheral edge of said optical film and to a depth "d" into said multiple layers so as to at least substantially reduce delamination of said multiple layers along at least said substantial portion of the peripheral edge of said optical film, wherein a remaining portion of said multiple layers, other than said substantial portion of the peripheral edge and said depth "d" into said multiple layers, is not fused so as to at least substantially reduce delamination of said multiple layers.

* * * * *

UNITED STATES PATENT AND TRADEMARK OFFICE
CERTIFICATE OF CORRECTION

| | | |
|---|---|---|
| PATENT NO. | : 8,932,701 B2 | Page 1 of 1 |
| APPLICATION NO. | : 10/564677 | |
| DATED | : January 13, 2015 | |
| INVENTOR(S) | : Kranz et al. | |

It is certified that error appears in the above-identified patent and that said Letters Patent is hereby corrected as shown below:

In the Specification

Col. 13, line 64, delete "teraphthalate" and insert -- terephthalate --.

Col. 18, line 30, delete "(PPPE)" and insert -- (PPE) --.

Col. 18, line 32, delete "atatctic" and insert -- atactic --.

Col. 18, line 33, delete "isotatctic" and insert -- isotactic --.

Col. 21, line 17, delete "deNemours," and insert -- de Nemours, --.

Col. 21, line 20, delete "(Osake," and insert -- (Osaka, --.

Col. 21, line 22, delete "TROSEFOL." and insert -- TROSIFOL. --.

Col. 21, line 24, delete "deNemours," and insert -- de Nemours, --.

Col. 22, line 39, delete "deNemours" and insert -- de Nemours --.

Signed and Sealed this
Twenty-second Day of March, 2016

Michelle K. Lee
*Director of the United States Patent and Trademark Office*